Patented Dec. 30, 1941

2,268,524

UNITED STATES PATENT OFFICE 2,268,524

VULCANIZATION OF RUBBER

Arnold R. Davis, Old Greenwich, Conn., assignor to American Cyanamid Company, New York, N. Y., a corporation of Maine No Drawing. Application January 4, 1940, Serial No. 312,407

15 Claims. (Cl. 260—782)

This invention relates to vulcanization of rubber and more particularly to the control of the activity of accelerators employed in the vulcanization. It relates further to certain new products.

It is known to use sulfur-bearing materials such as mercapto-benzothiazole, benzothiazyl disulfide and the like as accelerators of the vulcanization of rubber. These and other accelerators which come within the classification of compounds containing sulfur and which are acidic or which hydrolyze to produce mercaptans or thio acids have been recognized, in general, to be given greater activity by the presence of basic substances. Among the substances which may be used in this respect are the diaryl guanidines such, for example, as diphenyl guanidine, di-ortho-tolyl guanidine, phenyl-ortho-tolyl guanidine and the like which are apt to cause set-up or "scorching" in the rubber during the preliminary processing such as milling, calendering, extruding, etc., prior to the desired vulcanizing of the rubber, and they may even cause premature vulcanization of the rubber during storage.

It is an object of the invention therefore to produce an activator for a sulfur-bearing accelerator which has a slower rate of set-up than the diaryl guanidines such as diphenyl guanidine, for example.

I have found that activators having the above characteristic and known as delayed action activators may be obtained by heating a diaryl guanidine to fusion with the acids or acid anhydrides of the mono-terpene-maleic anhydride adducts or addition products.

The monoterpene-maleic anhydride adducts or addition products may be produced by heating a terpene of the formula $C_{10}H_{16}$ with maleic anhydride or with maleic acid with or without the use of a catalyst. Procedures for their preparation and a description of some of the products produced thereby are given, for example, in U. S. Patents Number 1,993,025, 1,993,031, 1,993,034 and 1,993,035.

The acid anhydrides of the terpene-maleic anhydride adducts or addition products described above are to be found in both the volatile and the non-volatile portions thereof. The volatile anhydrides may be distilled off under reduced pressures. For example, at a pressure of 4 mm., the fraction containing the dibasic acid anhydride of the monomeric terpene was obtained in the temperature range of 160–178° C. The non-volatile residue from the distillation will contain poly anhydrides of terpene polymers according to the work of E. R. Littmann reported in Ind. and Eng. Chem., 28, 1936, pages 1150–51.

While the invention will be particularly described with reference to the acid anhydrides of the monoterpene-maleic anhydride adduct, it is not intended that the invention be limited thereto since, as stated above, the acids as such, obtainable from the anhydrides by hydrolysis, will also form fusion products with the diaryl guanidines and constitute delayed action activators. Therefore in the specification and claims the term acid is intended to include not only the anhydride form but also the acid as such.

The complete monoterpene-maleic anhydride addition products, or the volatile dibasic anhydrides, or the non-volatile residue of the adducts may be fused with a diaryl guanidine to obtain a delayed action activator in accordance with the present invention.

The invention will be illustrated by the following examples, to which, however, the invention is not to be limited, parts being by weight.

Example 1

2 moles of diphenyl guanidine and 1 mole of the adduct dibasic anhydride were fused together by heating. A clear resin-like solid was formed which powdered easily and had a softening point of about 75° C. Samples containing this fusion product and also diphenyl guanidine alone in equivalent proportions were compounded as follows:

|  | Compound | |
|---|---|---|
|  | A | B |
| Smoked sheets | 100 | 100 |
| Zinc oxide | 6 | 6 |
| Sulfur | 3 | 3 |
| Benzothiazyl disulfide | .75 | .75 |
| Diphenyl guanidine | .465 | |
| Product of fusion of— 2 mols. diphenyl guanidine 1 mol. of adduct dibasic acid | | .725 |

The samples were then tested in a Williams plastometer using a 3 minute y value in inches at 100° C. The lower percentage change in the Williams y after heating at 85° C., for the sample containing the product, indicates it has scorched or set-up less than the one containing the diphenyl guanidine alone.

|  | A | B |
|---|---|---|
| No heat | .086 | .081 |
| After 1.5 hours in water at 85° C | .107 | .081 |
| Change...per cent | +24.4 | 0 |
| After 2 hours in water at 85° C | .176 | .121 |
| Change...per cent | +104 | +49.4 |

Tensile tests were then conducted on the above samples with results as follows:

|  | 10 min. at 130° C. | | | 25 min. at 130° C. | | | 40 min. at 130° C. | | |
|---|---|---|---|---|---|---|---|---|---|
|  | Mod.* | Ten.* | Elong.** | Mod.* | Ten.* | Elong.** | Mod.* | Ten.* | Elong.** |
| A | 675 | 3,870 | 760 | 1,305 | 4,090 | 665 | 1,510 | 4,130 | 650 |
| B | 625 | 3,810 | 755 | 1,340 | 4,500 | 680 | 1,555 | 4,415 | 660 |

*Modulus (500%) and tensile in lbs./sq. in.
**Elongation at break in per cent.

The tensile tests show that while the product of the fusion of diphenyl guanidine and the dibasic acid anhydride has less action at processing temperatures, it gives the same curing properties and cured product at vulcanizing temperatures as obtained with diphenyl guanidine.

In order to avoid stickiness on the mill when compounding, a small amount of stearic acid or the like, or an inert hydrocarbon such as medium process oil is employed. These added materials will also act as dispersing agents for the activators of the present invention.

*Example 2*

2.1 moles and 1.1 moles respectively of diphenyl guanidine were each fused by heating with one mole of monoterpene-maleic anhydride adduct and .1 mole of stearic acid to give clear resin-like products which were easily powdered and which at the end of 2½ months remained in the powdered state without caking. Samples containing these resin-like products and a sample containing diphenyl guanidine alone were prepared as in Example 1.

|  | Compound | | |
|---|---|---|---|
|  | C | D | E |
| Smoked sheets | 100 | 100 | 100 |
| Zinc oxide | 6 | 6 | 6 |
| Sulfur | 3 | 3 | 3 |
| Benzothiazyl disulfide | .75 | .75 | .75 |
| Product of fusion: D. P. G., 2.1 mols; Adduct, 1 mol; Stearic acid, 0.1 mol | .71 |  |  |
| Product of fusion: D. P. G., 1.1 mols; Adduct, 1 mol; Stearic acid, 0.1 mol |  | .945 |  |
| Diphenyl guanidine |  |  | .445 |

These samples were then tested in a Williams plastometer using a 3 minute y value in inches at 100° C.

|  | C | D | E |
|---|---|---|---|
| No heat | .086 | .082 | .086 |
| After 1.5 hours in water at 85° C | .101 | .078 | .279 |
| Change...percent | +16.1 | −4.9 | +224 |
| After 2 hours in water at 85° C | .161 | .085 | .403 |
| Change...percent | +87 | +3.7 | +377 |

These tests show that the resin-like product of 1.1 moles of diphenyl guanidine and 1 mole of the terpene-maleic anhydride adduct gave a very much lower rate of set-up than the diphenyl guanidine alone and was superior in this respect to the product made with 2.1 moles of diphenyl guanidine.

The samples were then tested at full cure for physical properties and gave values as follows:

|  | 10 min. at 130° C. | | | 25 min. at 130° C. | | | 40 min. at 130° C. | | |
|---|---|---|---|---|---|---|---|---|---|
|  | Mod.* | Ten.* | Elong.** | Mod.* | Ten.* | Elong.** | Mod.* | Ten.* | Elong.** |
| C | 690 | 4,120 | 755 | 1,240 | 4,400 | 700 | 1,480 | 4,545 | 675 |
| D | 450 | 3,395 | 800 | 1,155 | 4,540 | 710 | 1,365 | 4,240 | 675 |
| E | 1,020 | 4,650 | 730 | 1,595 | 4,635 | 675 | 1,775 | 4,300 | 635 |

*Modulus (500%) and tensile in lbs./sq. in.
**Elongation at break in percent.

The tensile tests show that at full cure the resin-like products of diphenyl guanidine and the monoterpene-maleic anhydride adduct gave essentially the physical properties obtained with diphenyl guanidine alone.

It is an advantage of the present invention that it provides for delayed action of the diaryl guanidine while at the same time the compounder has one less material to handle. A further advantage is that the new homogeneous resin-like products of relatively low softening point will disperse more readily in the rubber, thereby giving a more uniform cure than the usual acid reaction products of the diaryl guanidines, such as the oxalate or phthalate of diphenyl guanidine, which are crystalline materials with high melting points and do not disperse readily in rubber.

The proportions of the acids and diaryl guanidines which may be combined to form fusion products constituting delayed action activators may be varied to obtain best results according to the accelerator and diaryl guanidine employed. For example, while the preferred fusion product requires 1.1 moles of diphenyl guanidine it has been shown that the companion fusion product made with 2.1 moles also gave a slower rate of set-up than diphenyl guanidine alone. For example, the latter product might be very useful in instances in commercial compounding where a rate of set-up is desired which lies between that of the accelerator-activator combinations of benzothiazyl disulfide-diphenyl guanidine phthalate and benzothiazyl disulfide-diphenyl guanidine.

The delayed action activators of the present invention may be used to activate any sulfur-bearing accelerator which is activated by a basic material such as the diaryl guanidines.

The foregoing description is intended by way of illustration and not by way of limitation of the invention, the scope of which is defined in the appended claims.

What I claim is:

1. A method of treating rubber which comprises vulcanizing a vulcanizable rubber mix containing a sulfur-bearing accelerator and the product produced by heating to fusion a diaryl guanidine and a monoterpene-maleic anhydride addition product acid.

2. A method of treating rubber which comprises vulcanizing a vulcanizable rubber mix containing a sulfur-bearing accelerator and the product produced by heating to fusion a diaryl guanidine and a monoterpene-maleic anhydride addition product.

3. The method of claim 2 in which the diaryl guanidine heated with the addition product is diphenyl guanidine.

4. A method of treating rubber which comprises vulcanizing a vulcanizable rubber mix containing a sulfur-bearing accelerator and the product produced by heating to fusion a diaryl guanidine and a monoterpene-maleic anhydride addition product dibasic acid.

5. The method of claim 4 in which the diaryl guanidine heated with the dibasic acid is diphenyl guanidine.

6. A method of treating rubber which comprises vulcanizing a vulcanizable rubber mix containing a sulfur-bearing accelerator and the product produced by heating to fusion a diaryl guanidine, a monoterpene-maleic anhydride addition product and an organic dispersing agent.

7. A method of treating rubber which comprises vulcanizing a vulcanizable rubber mix containing a sulfur-bearing accelerator and the product produced by heating to fusion a diaryl guanidine, a monoterpene-maleic anhydride addition product and stearic acid.

8. A vulcanizable rubber mix having incorporated therein a sulfur-bearing accelerator and the product produced by heating to fusion a diaryl guanidine and a monoterpene-maleic anhydride addition product acid.

9. A vulcanizable rubber mix having incorporated therein a sulfur-bearing accelerator and the product produced by heating to fusion a diaryl guanidine and a monoterpene-maleic anhydride addition product.

10. A vulcanizable rubber mix having incorporated therein a sulfur-bearing accelerator and the product produced by heating to fusion diphenyl guanidine and a monoterpene-maleic anhydride addition product.

11. A vulcanizable rubber mix having incorporated therein a sulfur-bearing accelerator and the product produced by heating to fusion a diaryl guanidine and a monoterpene-maleic anhydride addition product dibasic acid.

12. A vulcanizable rubber mix having incorporated therein a sulfur-bearing accelerator and the product produced by heating to fusion diphenyl guanidine and a monoterpene-maleic anhydride addition product dibasic acid.

13. A vulcanizable rubber mix having incorporated therein a sulfur-bearing accelerator and the product produced by heating to fusion a diaryl guanidine, a monoterpene-maleic anhydride addition product and an organic dispersing agent.

14. A vulcanizable rubber mix having incorporated therein a sulfur-bearing accelerator and the product produced by heating to fusion a diaryl guanidine, a monoterpene-maleic anhydride addition product and stearic acid.

15. A vulcanizable rubber mix having incorporated therein a sulfur-bearing accelerator and the product produced by heating to fusion diphenyl guanidine, a monoterpene-maleic anhydride addition product and stearic acid.

ARNOLD R. DAVIS.